United States Patent [19]

Odawara et al.

[11] Patent Number: 4,555,716

[45] Date of Patent: Nov. 26, 1985

[54] OPTICAL DISK HAVING ELASTIC DEFORMABLE SPACER

[75] Inventors: Kazuharu Odawara; Yoshiaki Tago, both of Yokohama, Japan

[73] Assignee: Tokyo Shibaura Denki Kabushiki Kaisha, Kawasaki, Japan

[21] Appl. No.: 541,307

[22] Filed: Oct. 12, 1983

[30] Foreign Application Priority Data

Oct. 14, 1982 [JP] Japan .................................. 57-180277

[51] Int. Cl.⁴ ............................................. G01D 15/34
[52] U.S. Cl. .................................. 346/137; 346/135.1; 369/284
[58] Field of Search .......................... 346/135.1, 137; 369/284

[56] References Cited

U.S. PATENT DOCUMENTS 4,074,282 2/1978 Balas, Jr. et al. ................ 346/135 X
4,331,966 5/1982 Moe ..................................... 346/137
4,380,016 4/1983 Lehureau et al. ................ 346/135.1

Primary Examiner—E. A. Goldberg
Assistant Examiner—Gerald E. Preston
Attorney, Agent, or Firm—Cushman, Darby & Cushman

[57] ABSTRACT

An optical disk with a recording layer formed on the inner surface of a protective plate has data which is read out upon irradiation of a laser beam. A substrate supports the protective plate such that the recording layer opposes the substrate and a space is formed therebetween. The spacer is sandwiched between the protective plate and the substrate so as to couple them. The spacer is an elastically deformable member. Therefore, when the protective plate expands or contracts relative to the substrate, due to deformation of the spacer, excessive force does not affect the recording medium. Warp, wave or damage to the disk due to expansion/contraction of the protective plate or substrate can be prevented, thereby allowing stable data processing.

19 Claims, 17 Drawing Figures

OPTICAL DISK HAVING ELASTIC DEFORMABLE SPACER

BACKGROUND OF THE INVENTION

The present invention relates to an optical disk used in a filing system or audio video system.

One type of optical disk, the air sandwich type, has a hollow portion formed between a protective plate for protecting a recording layer and a substrate for supporting the protective plate. In an optical disk of this type, a laser beam must be transmitted through the protective plate with high precision, resulting in that a thickness and a material of the protective plate are thereby limited.

Conventionally, in an optical disk of this type having a plastic protective plate, the protective plate is not rigid so that it bends or warps due to changes in temperature, humidity or its own weight. In order to prevent disk distortion, a conventional optical disk 2 is known, as shown in FIG. 1. The optical disk 2 comprises a protective plate 6 made of a light-transmitting material and a substrate 8 made of a material more rigid than that of the protective plate 6. A recording layer 4 is formed on the inner surface of the protective plate 6. The protective plate 6 is formed integrally with the substrate 8 through an adhesive 9 such that a space 7 is formed between the protective plate 6 and the substrate 8.

Thus, in the optical disk 2, the material of the protective plate 6 differs from that of the substrate 8. When the protective plate 6 and the substrate 8 expand or contract due to a change in temperature or humidity, their expansion or contraction ratios differ from each other, thereby deforming the optical disk as a whole. In particular, in an air sandwich type optical disk, since the peripheral portion between the substrate 8 and the protective plate 6 must be sealed by the adhesive 9 in order to prevent dust from entering, a warp is formed when the protective plate expands relative to the substrate 8, as shown in FIG. 2. However, when the protective plate 6 contracts relative to the substrate 8, an inverted warp is formed, as shown in FIG. 3. When the protective plate 6 expands in the case where the substrate 8 is more rigid than the protective plate 6, a wave is formed in the protective plate 6, as shown in FIG. 4. However, when the protective plate 6 contracts in this case, the protective plate 6 separates from the adhesive 9 or is damaged, as shown in FIG. 5. As a result, the optical disk itself is damaged.

The warp and wave of the protective plate cause error in the incident angle and the optical path length of a laser beam, or degradation of data processing precision of the optical disk due to dust or the like entered from the portion that has separated. In the worst case, data processing cannot be performed.

SUMMARY OF THE INVENTION

It is an object of the present invention to provide an optical disk which is capable of performing stable data processing by preventing a warp or wave in a protective plate.

According to an aspect of the present invention, there is provided an optical disk comprising a recording layer for storing data which is read out upon irradiation of a laser beam, a protective plate for protecting said recording layer which has said recording layer on one major surface thereof and which allows transmission of the laser beam therethrough, a substrate for supporting said protective plate which opposes said protective plate so as to form a space therebetween, said recording layer being formed between said protective plate and said substrate, and an elastically deformable spacer which is disposed between said protective plate and said substrate and couples said protective plate and said substrate through said space thereby allowing expansion and contraction of said protective plate and said substrate relative to each other.

DETAILED DESCRIPTION OF THE PREFERRED EMBODIMENTS

An optical disk according to a first embodiment of the present invention will now be described with reference to FIGS. 6 to 10.

Figure 1:
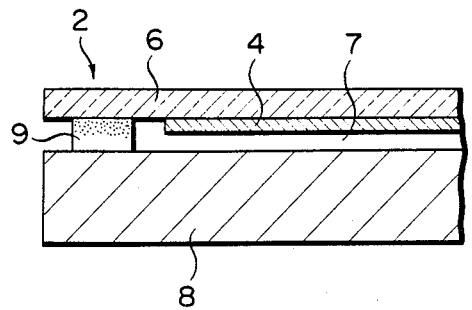
FIG. 1 is a sectional view showing part of a conventional optical disk.
Figure 2:
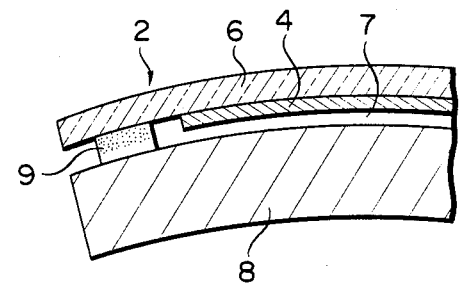
FIGS. 2 to 5 are sectional views showing parts of the conventional optical disk in order to explain the drawbacks thereof, respectively.
Figure 3:
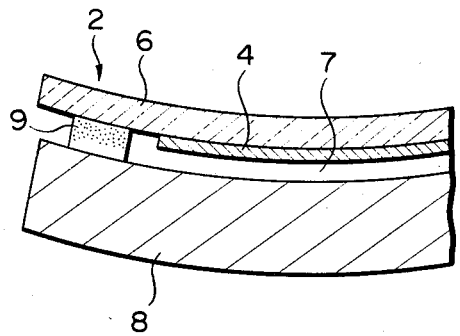
Figure 4:
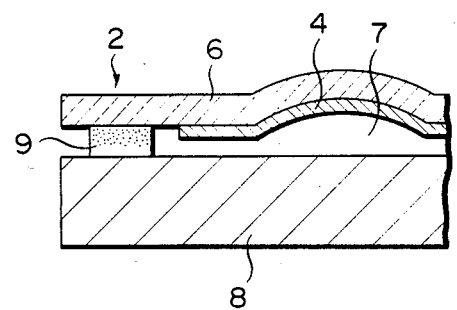
Figure 5:
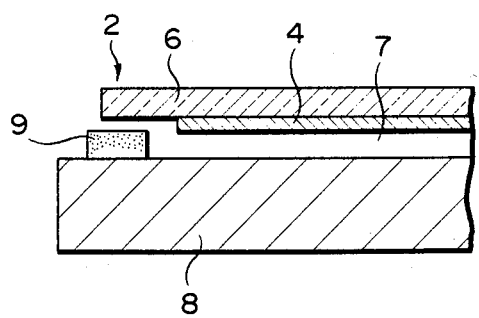
Figure 6:
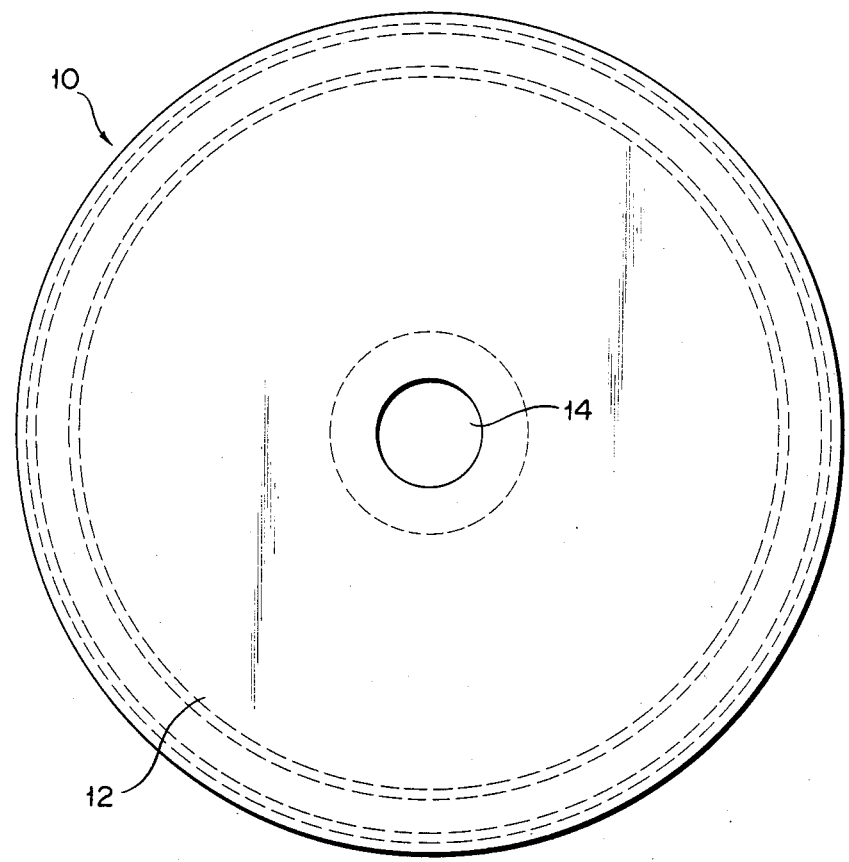
FIG. 6 is a plan view of an optical disk according to a first embodiment of the present invention.
Figure 7:
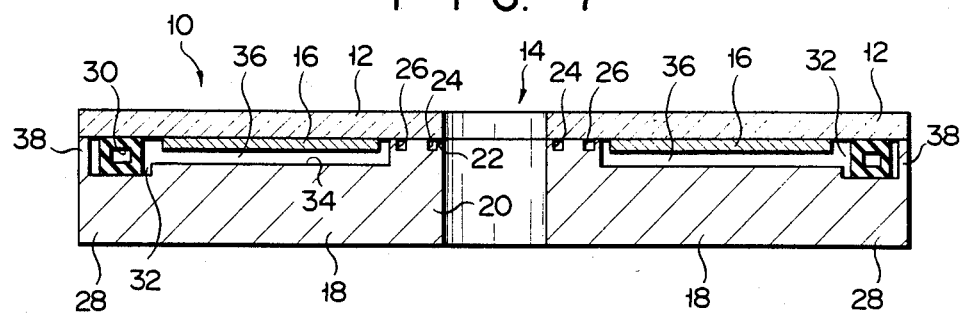
FIG. 7 is a longitudinal sectional view of the optical disk shown in FIG. 6.

As shown in FIGS. 6 and 7, an optical disk 10 of the present invention comprises a disk made of a light-transmitting material (i.e., plastic disk). A protective plate 12 is provided to protect a recording layer (to be described later). The protective plate 12 has an outer diameter of about 305 mm and a thickness of about 1.5 mm. A central or engaging hole 14 is formed in the optical disk 10 and engages with a projection of a turntable of a player (not shown). The hole 14 has a diameter of about 35 mm.

A metal recording layer 16 having predetermined data thereon is formed on one (i.e., inner surface) of the surfaces of the protective plate 12. Recorded data on the metal recording layer 16 can be read by a laser beam. A substrate 18 is formed, integral with the protective plate 12, such that the recording layer 16 opposes the substrate 18. The substrate 18 is more rigid than the protective plate 12. The substrate 18 comprises a metal disk in the same manner as that in the protective plate 12 and has a thickness of about 4 to 5 mm.

An inner peripheral portion 20 is formed in the substrate 18 to define the engaging hole 14. The inner peripheral portion 20 is radially formed from the edge defining the hole 14 and has a radial width of about 120 mm. The inner peripheral portion 20 has an adhesive surface 22 to which the protective plate 12 is adhered by an adhesive. Annular grooves 24 and 26 are formed in the surface 22, concentrical with the hole 14, to prevent excessive flow of the adhesive. An outer annular recess 32 is formed in an outer peripheral portion 28 of the substrate 18 to receive a spacer 30 (to be described later). The recess 32 has a width of about 5 to 6 mm. A step 34 is formed between the outer recess 32 and the inner peripheral portion 20, so that the step 34 corresponds to the recording layer 16 and defines a space 36. The space 36 between the recording layer 16 and the step 34 has a depth of about 1 to 2 mm.

Figure 8:
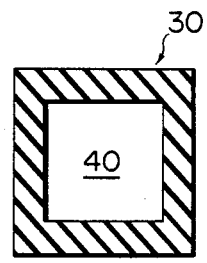
FIG. 8 is a sectional view of a spacer used in the optical disk shown in FIG. 6.

An outer wall 38 for protecting the spacer 30 (to be described later) from the outer side is formed in the substrate 18 on the outer side of the recess 32 such that the outer wall 38 contacts the protective plate 12. A deformable elastic member, i.e., an annular spacer 30 made of acrylonitrile-butadiene rubber (NBR) and having an inner square hollow section shown in FIG. 8, is disposed in the outer recess 32 along the periphery of the optical disk. The spacer 30 has a hollow portion and is easily deformable. The square section of the spacer 30 has a side of 3 to 4 mm and has a wall thickness of about 0.3 to 0.5 mm. The spacer 30 is attached by an adhesive between the bottom surface of the outer recess 32 and the protective plate 12. The outer recess 32 guides the spacer 30 and prevents excessive adhesive flow at the time the optical disk is assembled. As shown in FIG. 6, the spacer 30 is provided continuously along the periphery of the optical disk, so that no dirt or dust enters the space 36.

The effect of the optical disk according to the first embodiment of the present invention will be described with reference to FIGS. 9 and 10.

Figure 9:
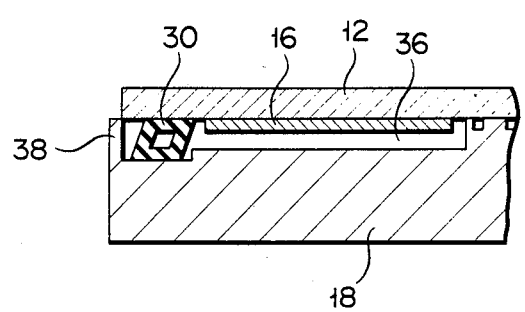
FIGS. 9 and 10 are sectional views showing parts of the optical disk (FIG. 7) in order to explain the effects thereof, respectively.

As shown in FIG. 9, when the protective plate 12 contracts relative to the substrate 18 due to changes in temperature or humidity, the spacer 30 is deformed toward the center of the optical disk. Since the spacer 30 has good elasticity, slight displacement of the protective plate 12 with respect to the substrate 18 is allowed. Unlike the conventional optical disk, no excessive force acts on the protective plate 12 or the substrate 18. As a result, the substrate 18 or the protective plate 12 will not be deformed, warped or waved, and separating and damage of the optical disk can be prevented.

Figure 10:
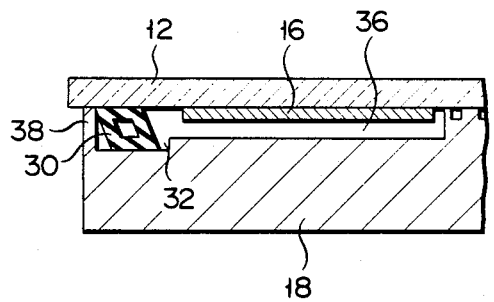

Similarly, as shown in FIG. 10, when the protective plate 12 expands relative to the substrate 18, the spacer 30 is deformed outward. However, since the spacer 30 has good elasticity, slight displacement of the protective plate 12 with respect to the substrate 18 can be allowed. As a result, the deformation, separating or damage of the protective plate 12 can be prevented.

According to the optical disk of the first embodiment, since the deformation, separating or damage of a substrate or a protective plate can be prevented, an optical disk is provided which does not change with changes in temperature or humidity and can constantly perform stable data processing.

Figure 13:
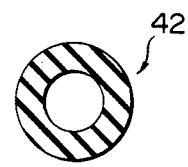
FIG. 13 is a longitudinal sectional view of a spacer used in the optical disk shown in FIG. 11.
Figure 11:
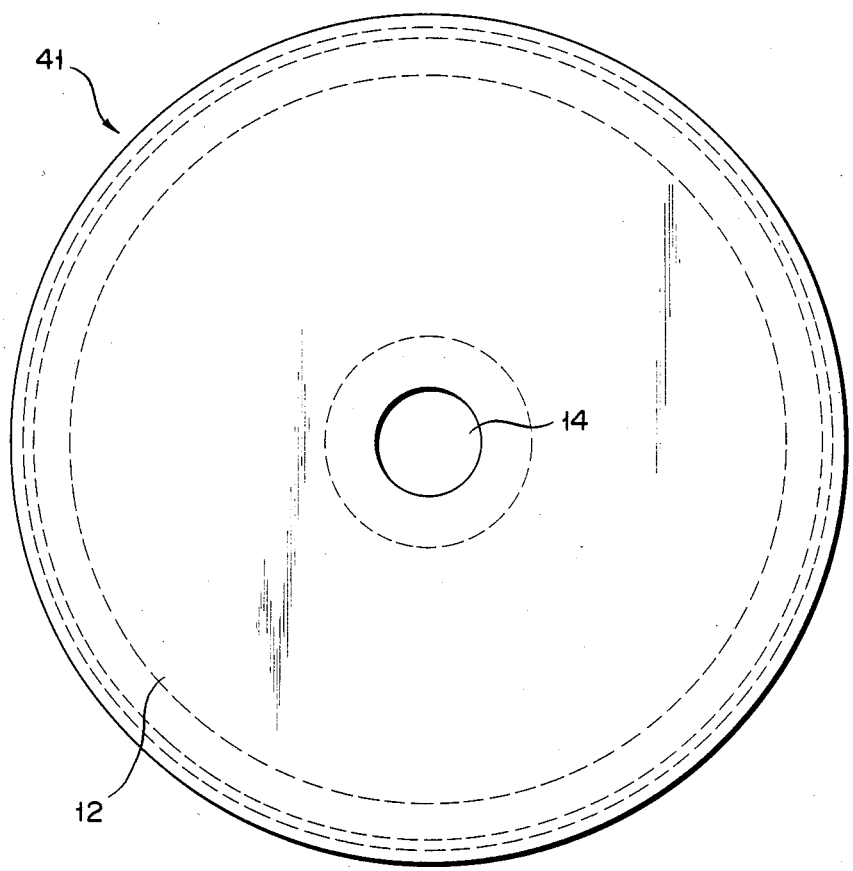
FIG. 11 is a plan view of an optical disk according to a second embodiment of the present invention.
Figure 12:
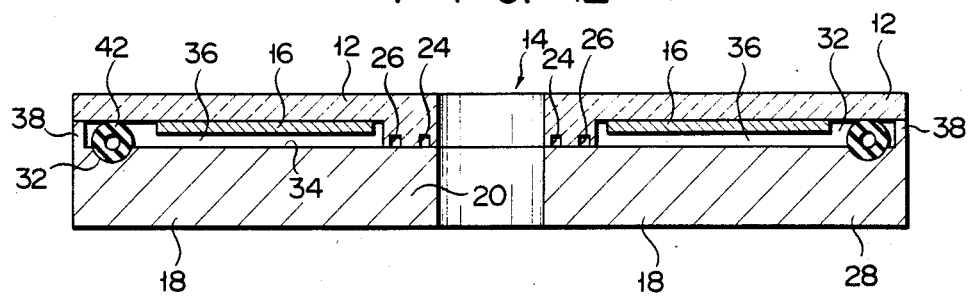
FIG. 12 is a longitudinal sectional view of the optical disk shown in FIG. 11.

An optical disk according to a second embodiment of the present invention will now be described with reference to FIGS. 11 to 13. The same reference numerals used in the first embodiment denote the same parts in the second embodiment, and a detailed description thereof will be omitted.

The optical disk 41 of the second embodiment has a spacer 42 in place of the spacer 30 of the first embodiment. The spacer 42 has a circular section unlike the spacer 30 which has a square section. An outer recess 32 of the second embodiment has a partially arcuated shape so as to correspond to the circular section of the spacer 42.

An inner peripheral portion 20 is formed to be coplanar with a step 34. An adhesive surface 22 of a protective plate 12 which corresponds to the inner peripheral portion 20 projects and is attached by an adhesive to a substrate 18. Grooves 24 and 26 are formed in the adhesive surface 22 to prevent excessive flow of the adhesive.

The same effects achieved in the first embodiment can be obtained in the second embodiment.

Figure 14:
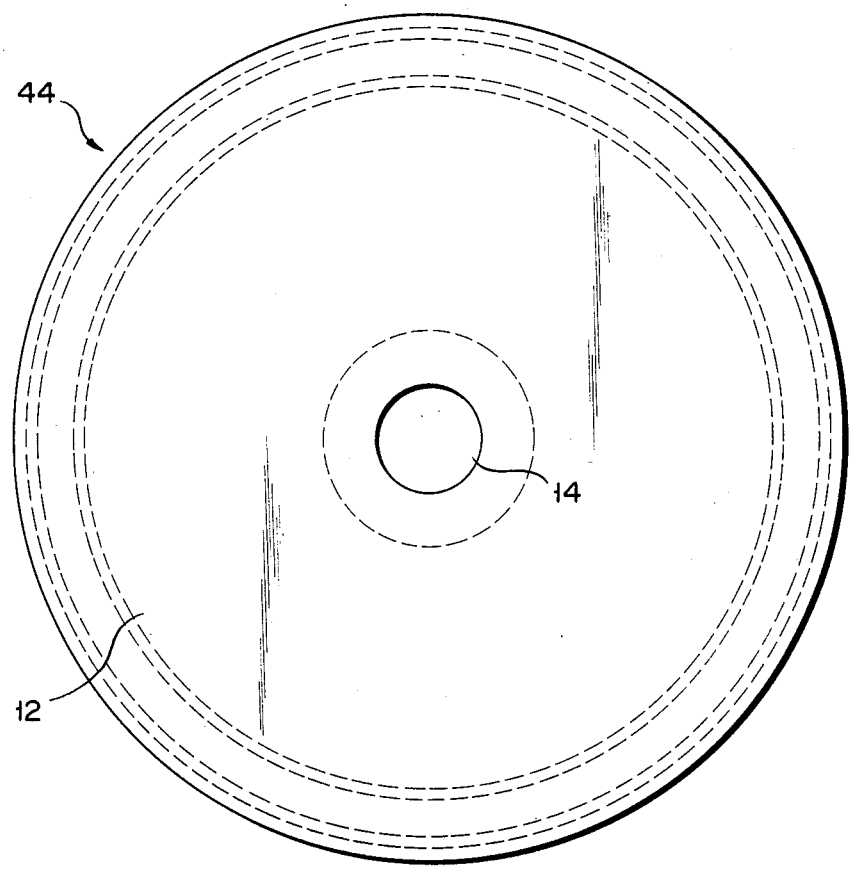
FIG. 14 is a plan view of an optical disk according to a third embodiment of the present invention.
Figure 15:
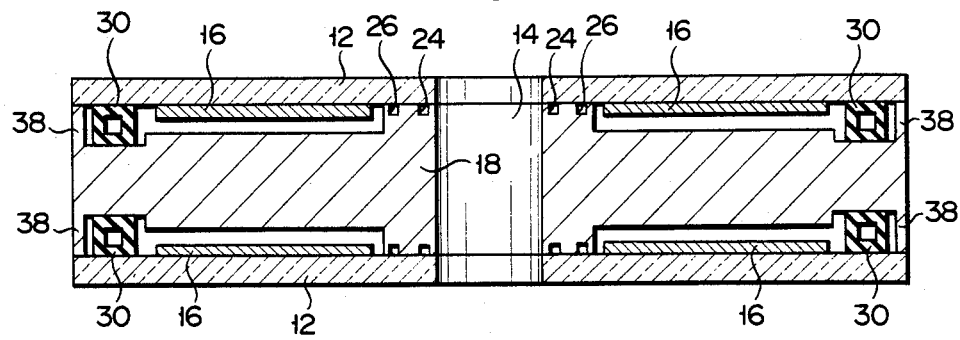
FIG. 15 is a longitudinal sectional view of the optical disk shown in FIG. 14.

An optical disk 44, according to a third embodiment of the present invention, will be described with reference to FIGS. 14 and 15. The same reference numerals used in the first embodiment denote the same parts in the third embodiment, and a detailed description thereof will be omitted.

An optical disk 44 of the third embodiment has recording layers on two major surfaces and has a structure wherein two optical disks 10 of the first embodiment are attached such that the substrates 18 are attached to each other.

Protective plates 12 are attached to upper and lower surfaces of a substrate 18. Recording layers 16 are formed on inner surfaces of the protective plates 12, respectively. Spacers 30 are sandwiched between the respective protective plates 12 and the substrate 18 in the same manner as in the first embodiment, respectively.

The same effect achieved in the first embodiment can be obtained in the third embodiment.

Furthermore, according to the third embodiment, the optical disk having recording layers on the upper and lower sides thereof can be obtained.

The present invention is not limited to the particular embodiments described above. Various changes and modifications may be made within the spirit and scope of the present invention.

Figure 16:
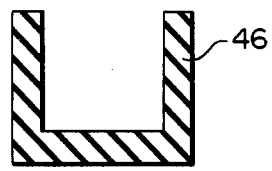
FIGS. 16 and 17 are sectional views showing modifications of the spacer used in the optical disks of the present invention, respectively.
Figure 17:
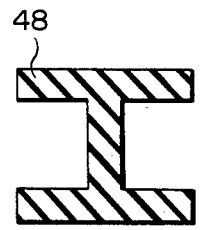

For example, the spacers have square or circular sections. However, as shown in FIG. 16, a spacer 46 having a U-shaped section may be used. Alternatively, a spacer 48 having an H-shaped section may be used to obtain the same effect as in the embodiments described above.

In the embodiments described above, the spacers have hollow central portions. However, a solid spacer may be used to obtain the same effect.

In addition to these modifications, the spacer may be made of a synthetic resin such as silicone having good elasticity, instead of rubber.

What is claimed is:

1. An optical disk comprising:
   a recording layer for storing data which is adapted to be read upon irradiation with a laser beam;
   a protective plate for protecting said recording layer, with said recording layer being formed on one major surface of said plate, said plate being adapted to allow transmission of a laser beam therethrough;
   a substrate, opposing said protective plate, for supporting said protective plate so as to form a space therebetween and having an outer wall around an outer peripheral portion of said substrate extending to support an outer peripheral portion of said plate, said recording layer being formed between said protective plate and said substrate; and an elastically deformable spacer, disposed within said space radially inward of said wall close thereto and attached to said protective plate and said substrate, for coupling said protective plate and said substrate through said space so as to allow expansion and contraction of said protective plate and said substrate relative to each other without deformation of said plate.

2. An optical disk according to claim 1, wherein said spacer is made of an elastic synthetic resin.

3. An optical disk according ro claim 1, wherein said spacer is made of rubber.

4. An optical disk according to claim 3, wherein said spacer has a hollow portion to permit said spacer to be easily elastically deformed.

5. An optical disk according to claim 4, wherein said hollow portion of said spacer has a square cross-section.

6. An optical disk according to claim 4, wherein said hollow portion of said spacer has a circular cross-section.

7. An optical disk according to claim 4, wherein said substrate has a groove for defining a position of said spacer in an outer peripheral portion thereof.

8. An optical disk according to claim 1, wherein said substrate is more rigid than said protective plate thereby firmly supporting said protective plate.

9. An optical disk according to claim 1, wherein said substrate and said protective plate are attached by an adhesive at central portions thereof, and a groove for preventing excessive adhesive flow is formed in the central portion of said substrate.

10. An optical disk according to claim 1, including another protective plate such that the two protective plates are respectively attached to two major surfaces of said substrate, one protective plate of said two protective plates being coupled to one of said two major surfaces of said substrate through one spacer member of said spacer and the other protective plate of said two protective plates being coupled to the other of said two major surfaces of said substrate through the other spacer member of said spacer, said one protective plate having one recording layer member of said recording layer on an inner surface thereof, and the other protective plate having the other recording layer member of said recording layer on an inner surface thereof.

11. An optical disk according to claim 10, wherein each of said spacer members is made of an elastic synthetic resin.

12. An optical disk according to claim 10, wherein each of said spacer members is made of rubber.

13. An optical disk according to claim 12, wherein each of said spacer members has a hollow portion thereby said spacer being elastically deformed easily.

14. An optical disk according to claim 13, wherein said hollow portion of each of said spacer members has a square section.

15. An optical disk according to claim 13, wherein said hollow portion of each of said spacer members has a circular section.

16. An optical disk according to claim 13, wherein said substrate has a groove for defining a position of each of said spacer members in an outer peripheral portion of said substrate.

17. An optical disk according to claim 16, wherein said substrate has an outer wall extending toward each of said protective plate members along the outer peripheral portion, thereby protecting said spacer members from the outside.

18. An optical disk according to claim 10, wherein said substrate is more rigid than said protective plate members thereby firmly supporting said protective plate members.

19. An optical disk according to claim 10, wherein said substrate and said protective plate members are attached by an adhesive at central portions thereof, and a groove for preventing excessive adhesive flow is formed in the central portion of said substrate.

* * * * *